United States Patent [19]

Jones

[11] Patent Number: 4,932,478
[45] Date of Patent: Jun. 12, 1990

[54] TOOTH POINT FOR EARTH WORKING
[75] Inventor: Larren F. Jones, Aloha, Oreg.
[73] Assignee: ESCO Corporation, Portland, Oreg.
[21] Appl. No.: 235,110
[22] Filed: Aug. 22, 1988
[51] Int. Cl.5 ............................................. A01B 13/08
[52] U.S. Cl. .................................. 172/699; 37/142 R; 172/713; 172/772
[58] Field of Search ............ 37/142 R, 142 A, 141 R; 172/719, 762, 699 I, 713, 772

[56] References Cited

U.S. PATENT DOCUMENTS

| | | | |
|---|---|---|---|
| 3,026,947 | 3/1962 | Larsen et al. | 37/142 R |
| 3,259,087 | 7/1966 | Horton | 172/719 X |
| 3,268,012 | 8/1966 | Ratkowski | 172/719 X |
| 3,387,668 | 6/1968 | Mathers | 172/719 |
| 3,961,788 | 6/1976 | Helton et al. | 172/719 X |
| 4,013,130 | 3/1977 | Wirt et al. | 37/142 R X |
| 4,129,934 | 12/1978 | Gettman | 37/142 A X |
| 4,326,348 | 4/1982 | Emrich | 37/142 R |

FOREIGN PATENT DOCUMENTS 1900608  1/1978  Fed. Rep. of Germany ...... 172/719

Primary Examiner—Edgar S. Burr
Assistant Examiner—Moshe I. Cohen
Attorney, Agent, or Firm—Tilton, Fallon, Lungmus & Chestnut

[57] ABSTRACT

A tooth point for earth working, particularly ripping, which includes a relatively elongated body having rearwardly projecting tongue and recess means which cooperate with complementary tongue and recess means on a ripper shank protector.

7 Claims, 3 Drawing Sheets

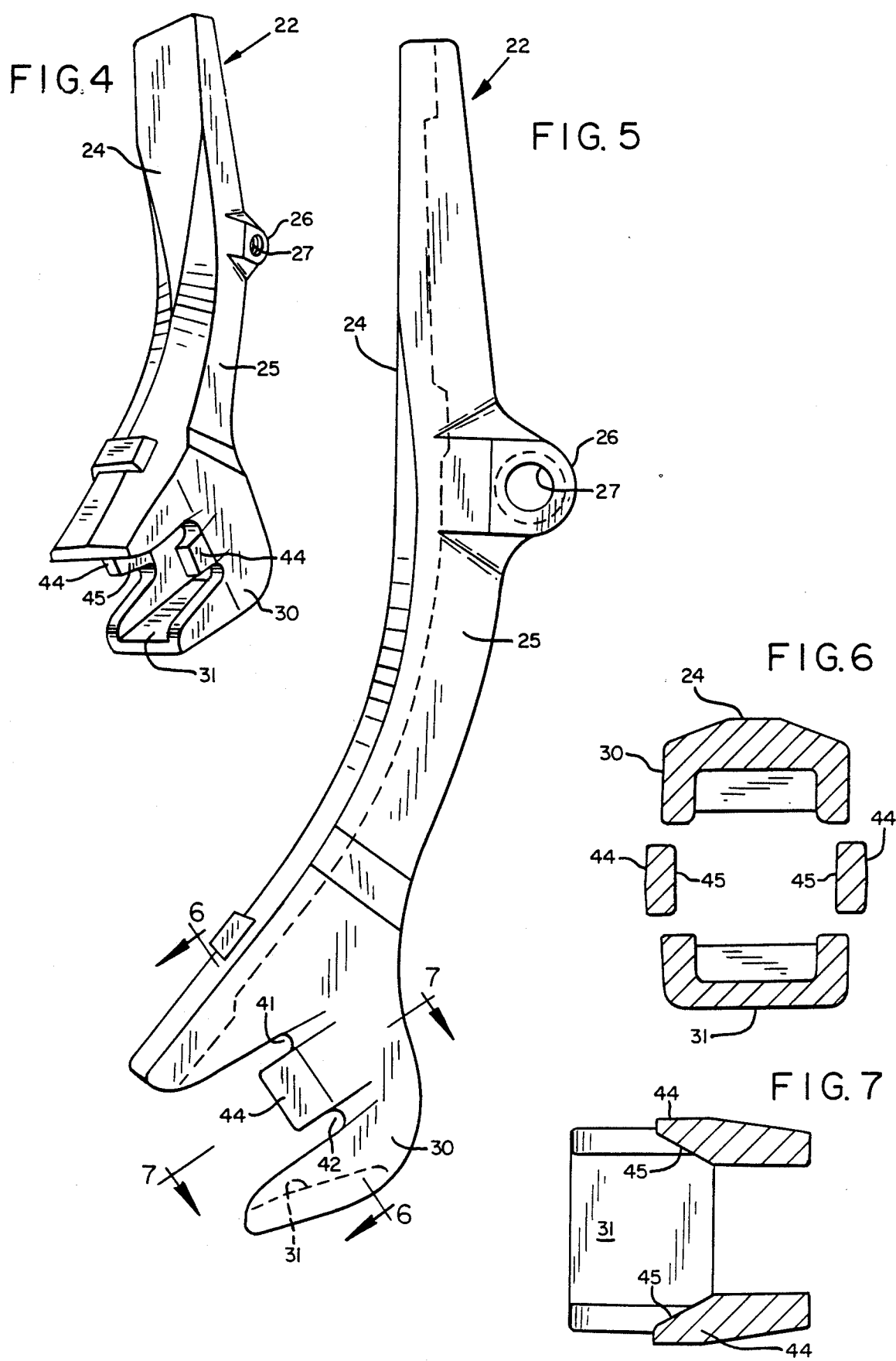

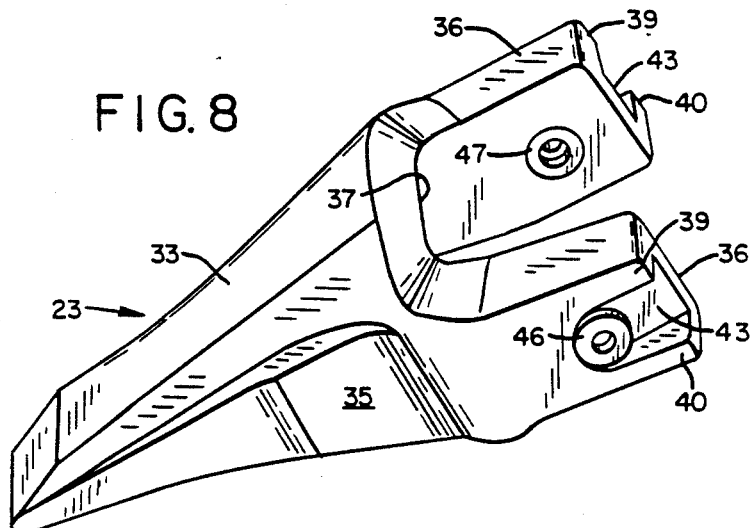
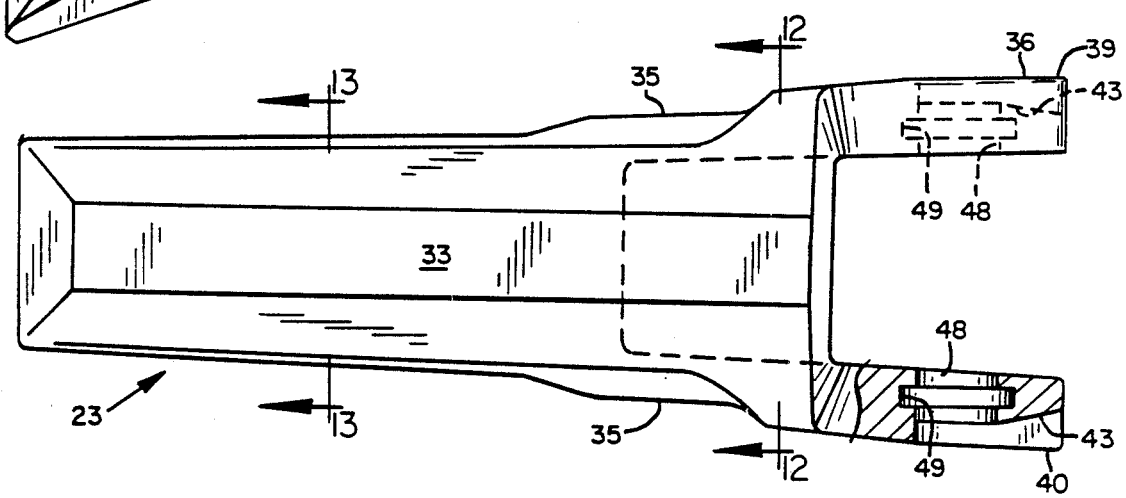
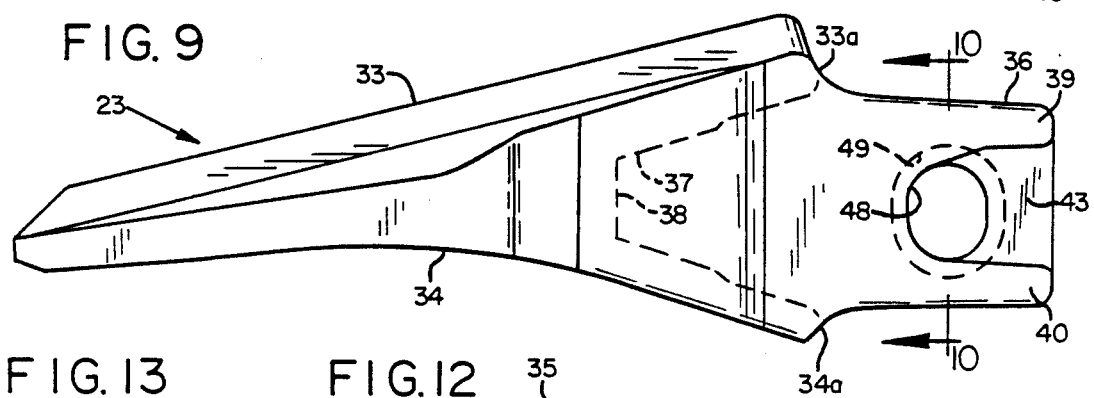
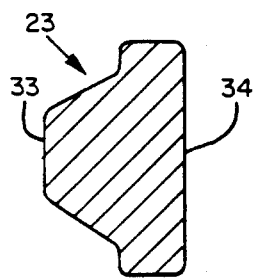
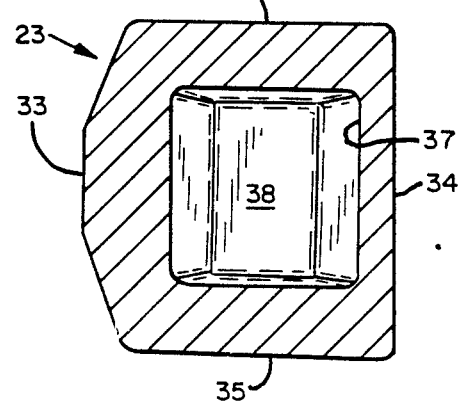
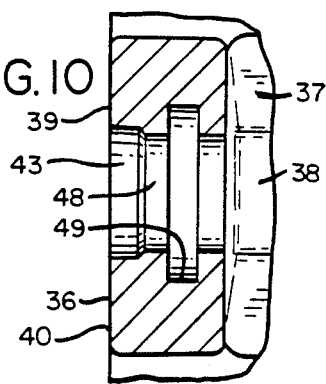

TOOTH POINT FOR EARTH WORKING

BACKGROUND AND SUMMARY OF INVENTION

This invention relates to a tooth point for earth working and, more particularly, to a tooth point having a novel coaction with the supporting parts therefor.

In all forms of earth working, viz., excavating, digging, ripping, etc., it is necessary to equip the forward end of the earth working tool with a replaceable, generally wedge shaped tip which is conventionally referred to as a "point". When the points become worn, it is necessary to replace them with a minimum of downtime. Normally a holder such as a tooth adapter, ripper shank, etc. will accommodate between 5 and 30 replacement points before the holder itself needs to be replaced. The life of the supporting holder also can be extended by protective devices such as those seen in co-owned U.S. Pat. No. 4,326,348. In that patent a novel cooperation was provided between the holder wear cap and the tooth point to provide stabilization.

The instant invention also provides a novel cooperation between a holder, protector therefor and tooth point and one that finds advantageous operation in ripping. A general description of ripping is found in co-owned U.S. Pat. No. 3,026,947 and the parts of a conventional ripper are seen in co-owned U.S. Pat. No. 4,129,934.

According to the invention, the earth working tooth point has coextensive top and bottom walls connected by coextensive sidewalls with the sidewalls projecting further rearwardly than the top and bottom walls. The rearward projections of the sidewalls define tongue and recess means which cooperate with complementary tongue and recess means on the protector. This has been found particularly advantageous in the replacement of points and protectors of commercially available ripper systems by being approximately 20% lighter yet having approximately 10% more wear metal along with a better geometry for ripping. The arrangement while providing the foregoing advantages also is mountable to existing ripper shanks.

Other objects and advantages of the invention may be seen in the details of the ensuing specification.

The invention is described in conjunction with an illustrative embodiment in the accompanying drawing, in which:

FIG. 4 is a perspective view of the protector or shroud portion of the previous views;

FIG. 5 is a fragmentary side elevational view of the protector of FIG. 4;

FIG. 6 is a sectional view taken along the sight line 6—6 of FIG. 5;

FIG. 7 is a sectional view taken along the sight line 7—7 of FIG. 5;

FIG. 8 is a perspective view of the earth working point of the invention;

FIG. 9 is a side elevational view of the point of FIG. 8;

FIG. 10 is a sectional view taken along the sight line 10—10 of FIG. 9;

FIG. 11 is a top plan view of the point of FIG. 9;

FIGS. 12 and 13 are, respectively, sectional views taken along the sight lines 12—12 and 13—13 of FIG. 11.

DETAILED DESCRIPTION

Figure 1:
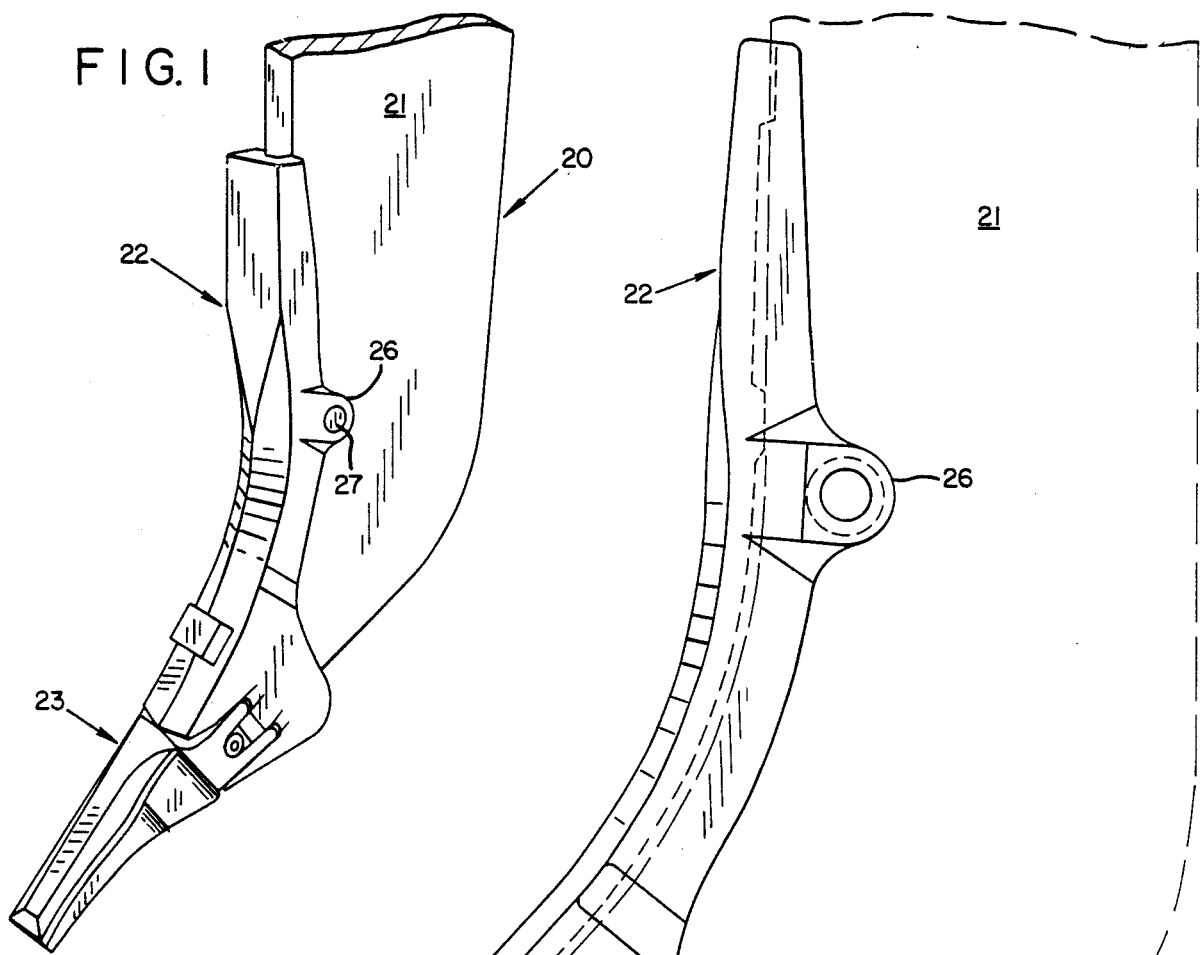
FIG. 1 is a perspective view of a ripper shank equipped with the novel elements of the invention.
Figure 2:
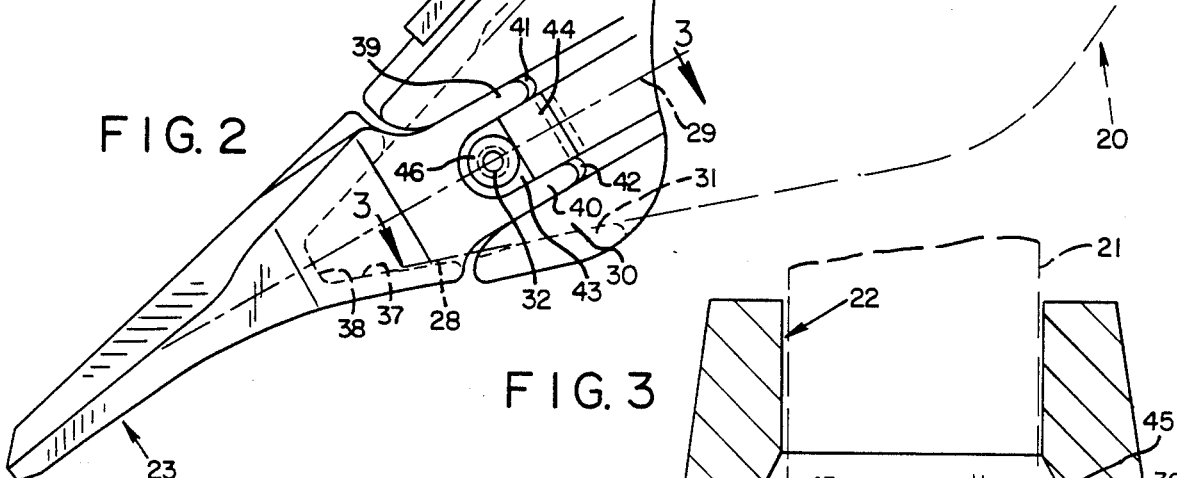
FIG. 2 is a fragmentary side elevational view of the construction of FIG. 1.

Referring now to the first drawing sheet and particularly to FIGS. 1 and 2, the numeral 20 designates generally a ripper assembly which is adapted to be mounted on the rear of a tractor (not shown). The ripper assembly includes a shank generally designated 21 which is of conventional construction. The numeral 22 designates generally the inventive protector or shroud which is provided in front facing relation to the shank 21. The numeral 23 designates generally the inventive tooth point which is the principal replaceable element in the system.

The protector 22 as can be seen in detail on the second drawing sheet which includes FIGS. 4-7. The protector 22 is a unitary body and includes a front or forwardly facing wall 24 and a pair of rearwardly extending sidewalls 25. The front and sidewalls are contoured over most of their length to fit existing shanks 21. In particular, the sidewalls are equipped with bosses 26 providing pin receiving openings 27 which mate with corresponding openings in the shank 21. The remainder of the releasable mounting of the protector 24 to the shank 21 is accomplished by the lower portion of the protector 22 in cooperation with the point 23 thus saving the cost and use of one pin over conventional protectors.

The conventional shank 21 which is shown in part in dotted line in FIG. 2 is equipped with a point-receiving nose 28. This is located at the forward, lower end of the shank 21 and normally is disposed at an angle of about 35° to the surface being ripped. Here the angle referred to is defined in part by the longitudinal axis 29 of the nose 28 which also corresponds to the longitudinal axis of the point box section portion 23, i.e., the path along which the point is moved for installation on the nose 28.

Referring now to FIG. 5, the protector sidewalls 25 are enlarged rearwardly, downwardly as at 30 and in the lower extremity thereof are connected by a cross wall 31 (see also FIG. 6). The cross wall 31 provides a second means for releasably securing the protector 22 to the shank 21.

ASSEMBLY

To equip an existing shank 21 with the invention, the protector 22 is ensleeved over the nose 28 in the configuration depicted in FIG. 2 wherein the cross wall 31 bears against the lower side of the adapter in the vicinity of the nose 28. When so positioned, the protector has aligned openings 27 in register with the anchoring opening provided in the shank and suitable pin locks (to be described hereinafter) are inserted.

Thereafter, the point 23 is mounted on the adapter nose in the fashion depicted in FIG. 2 and a locking pin 32 is inserted through aligned openings in the point sidewalls and nose 28. At the same time a novel locking arrangement is developed between the point 23 and protector 22.

The point 23 is seen in detail on the third drawing sheet and is seen to include a top wall 33 and a bottom wall 34 which are generally coextensive in length—see the rear portions designated 33a and 34a in FIG. 9.

Connecting the top and bottom walls 33 and 34 are sidewalls 35 which also are generally coextensive—see the rearward extensions 36 in FIG. 11. It will be noted that the rearward extensions 36 of the sidewalls 35 extend substantially beyond the rear ends 33a and 34a of the top and bottom walls. In fact, it is advantageous to have the rearward projection of a length at least as great as the depth of the nose receiving socket 37 (see the upper central portion of FIGS. 8 and 9). The socket 37 at its forward end is defined by a forward wall 38 and at its rearward end by the rear ends of the top and bottom walls 33a and 34a respectively.

The rearward extensions 36 provide a novel tongue and recess means in the form of generally parallel, spaced apart tongues 39 and 40 which are received within complementary recesses 41 and 42 in the protector 22 (compare FIGS. 2 and 5).

Additionally, the rear projections or sections 36 of the point sidewalls 35 provide therebetween a recess 43 defined by a beveled wall as seen particularly at the right hand portion of FIG. 11. These underlie the tongues 44 provided on the protector 22 between the recesses 41 and 42. As can be appreciated from a consideration of FIG. 7, the tongues 44 are beveled at their forward extremities by an inclined wall 45 which mates with the bevel 43 in the fashion depicted in FIG. 3. Thus, not only do the tongues 39, 40 cooperate with the recesses 41, 42 to provide stabilization but the additional tongue 44 cooperates with the recess 43 in providing lateral stabilization.

Figure 3:
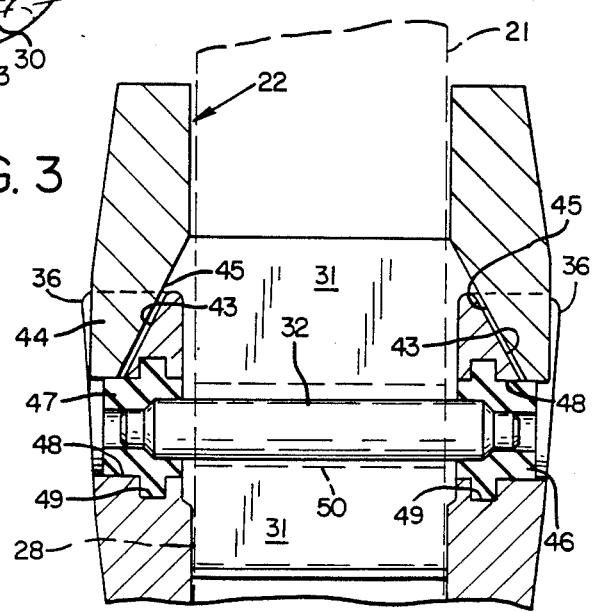
FIG. 3 is a fragmentary sectional view taken along the sight line 3—3 of FIG. 2.

As can be appreciated from FIG. 3, the pin lock 32 is provided just forward of the beveled surfaces 43, 45. The pin lock 32 has associated therewith bushings 46 and 47 which are fitted within correspondingly shaped openings 48 in the rearward projections 36 of the sidewalls 35. As also can be seen in FIG. 11, the rearward projections 36 are equipped with aligned openings 48 which provide an annular shoulder 49 midway of their transverse length for the receipt of similarly shaped bushings 46 and 47. These bushings have, in effect, a staggered cross section which accommodates pin 32 provided with reduced ends which spread the rubber bushings when it is driven into the assembly.

The diameter of the pin lock 32 is advantageously selected that the pin lock does not come into bearing contact with the hole 50 in the nose. This assures that when the ripper tooth system is under load, the pin does not bend and overcomes the objectional removal problems customers have encountered with existing ripper systems. A similar pin lock is provided for the protector openings at 27.

While in the foregoing specification, a detailed description of an embodiment of the invention has been set down for the purpose of illustration, many variations in the details hereingiven may be made by those skilled in the art without departing from the spirit and scope of the invention.

I claim:

1. A tooth point for earth-working comprising a relatively elongated body having a forward earth-engaging end and a nose-receiving socket at the rear end, said point being defined generally by coextensive top and bottom walls connected by lateral sidewalls with the interior of said walls defining said socket, said sidewalls each terminating in a pair of generally parallel, spaced apart tongues extending rearwardly of said top and bottom walls, said top and bottom walls having a rear end spaced forwardly of the rear end of said tongues a distance sufficient to provide a length of said tongues at least about as great as the length of said socket whereby the amount of throw-away metal in a work point is substantially reduced, each said pair of tongues being connected by a web constituting a continuation of the sidewall interiors, each said web having a thickness less than its associated sidewall to provide a recessed outer web wall, aligned pin-receiving openings in said webs, said outer web walls being rearwardly beveled toward each other in proceeding rearwardly from said pin-receiving openings and being adapted thereby to be lapped by a portion of an associated protector to provide lateral stabilization.

2. A tool for earth working comprising a generally vertically-extending shank adapted to be mounted on the rear of a tractor or the like, said shank having a forwardly facing surface adapted to be equipped with a forwardly projecting nose at the lower end thereof, a protector removably mounted on said shank and a point removably mounted on said nose, said protector having a pair of sidewalls connected by a front wall, said point having top and bottom walls interconnected by a pair of sidewalls with said point sidewalls being aligned with said protector sidewalls, interlocking tongue and recess means on said point and protector sidewalls, first pin means releasably securing said point to said nose and second pin means releasably securing said protector to said shank, said second pin means being spaced upwardly a spaced distance and constituting the only pin means releasably securing said protector to said shank, said point sidewalls being equipped with aligned openings for receipt of said first pin means, each opening having an internal shoulder intermediate its length, a staggered cross-section bushing mounted in each opening with each bushing having a through passage generally congruent with the bushing exterior, and a pin mounted in said bushings.

3. The tool of claim 2 in which said nose has a bore generally aligned with said point openings, said pin having a diameter sufficiently smaller than said nose bore whereby said pin avoids bearing contact with said nose when said point is under load.

4. A ripper for earth working comprising a generally vertically-extending shank adapted to be mounted on the rear of a tractor or the like, said shank having a forwardly facing surface adapted to be equipped with a protector, said shank also being equipped with a forwardly projecting nose at the lower end thereof, a protector removably mounted on said shank and a point removably mounted on said nose, said shroud having a pair of sidewalls connected by a front wall, said point having top and bottom walls interconnected by a pair of coextensive sidewalls with said point sidewalls being aligned with said protector sidewalls, interlocking tongue and recess means on said point and protector sidewalls, first pin means releasably securing said point to said nose and second pin means releasably securing said protector to said shank, said point being relatively elongated and having a socket shaped to fit said nose, said point being installable on said nose by moving along the point longitudinal axis said point top and bottom walls being coextensive and having a rear end spaced forward of the rear end of said point sidewalls a distance sufficient to provide a length of said point tongue means at least about as great as the length of said socket whereby the amount of throw-away metal in a worn point is substantially reduced, said point sidewalls being equipped with aligned openings for receipt of said first pin means, each opening having an internal shoulder intermediate its length, a staggered cross-section bushing mounted in each opening with each bushing having a through passage generally congruent with the bushing exterior, and a pin mounted in said bushings.

5. The ripper of claim 4 in which said nose has a bore generally aligned with said point openings, said pin having a diameter sufficiently smaller than said nose bore whereby said pin avoids bearing contact with said nose when said point is under load.

6. A tool for earth working comprising shank means equipped with a forwardly projecting nose at the lower end thereof, a point removably mounted on said nose, said point having top and bottom walls interconnected by a pair of sidewalls with said point sidewalls being adapted to be aligned with sidewalls of said shank means, interlocking tongues and recess means on said point and shank sidewalls, pin means releasably securing said point to said nose said point sidewalls being equipped with aligned openings for receipt of said pin means, each opening having an internal shoulder intermediate its length, a staggered cross-section bushing mounted in each opening with each bushing having a through passage generally congruent with the bushing exterior, and a pin mounted in said bushings.

7. The tool of claim 6 in which said nose has a bore generally aligned with said point openings, said pin having a diameter sufficiently smaller than said nose bore whereby said pin avoids bearing contact with said nose when said point is under load.

* * * * *